(12) United States Patent
Sonotsu

(10) Patent No.: US 8,119,913 B2
(45) Date of Patent: Feb. 21, 2012

(54) PROTECTOR FOR WIRE HARNESS

(75) Inventor: Masaaki Sonotsu, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 316 days.

(21) Appl. No.: 12/449,814

(22) PCT Filed: Sep. 25, 2007

(86) PCT No.: PCT/JP2007/068516
§ 371 (c)(1),
(2), (4) Date: Aug. 26, 2009

(87) PCT Pub. No.: WO2008/111250
PCT Pub. Date: Sep. 18, 2008

(65) Prior Publication Data
US 2010/0101819 A1    Apr. 29, 2010

(30) Foreign Application Priority Data
Mar. 15, 2007  (JP) .................... 2007-067611

(51) Int. Cl.
*H02G 3/04* (2006.01)
(52) U.S. Cl. ............. 174/68.3; 174/68.1; 174/72 C; 174/97; 174/101; 52/287.1; 248/68.1
(58) Field of Classification Search ........... 174/68.3, 174/68.1, 72 C, 97, 101, 95; 52/287.1; 248/68.1
See application file for complete search history.

(56) References Cited

U.S. PATENT DOCUMENTS

| | | | | |
|---|---|---|---|---|
| 5,359,143 A * | 10/1994 | Simon | ............... | 174/101 |
| 6,143,984 A * | 11/2000 | Auteri | ............... | 174/68.3 |
| 7,038,133 B2 * | 5/2006 | Arai et al. | ............... | 174/72 A |
| 7,815,152 B2 * | 10/2010 | Beck | ............... | 248/68.1 |

FOREIGN PATENT DOCUMENTS

| | | |
|---|---|---|
| JP | 3009597 | 1/1995 |
| JP | 10-084613 | 3/1998 |
| JP | 2001-095126 | 4/2001 |

* cited by examiner

*Primary Examiner* — Dhirubhai R Patel
(74) *Attorney, Agent, or Firm* — Gerald E. Hespos; Michael J. Porco

(57) ABSTRACT

A first coupling of a first protector includes a U-shaped inner wall section and a cover. The inner wall section has an inner bottom wall and opposed inner side walls. The cover extends from outer surfaces of the inner bottom wall and opposed inner side walls of the inner wall section to a distal end opening in the first coupling. The cover is open at a distal end. A second coupling of a second protector includes a bottom wall and opposed side walls that are inserted through the distal end opening into a clearance defined between the inner wall section and the cover of the first protector. The first and second couplings of the first and second protectors are connected together so that the second coupling of the second protector is caught between the inner wall and the cover of the first coupling of the first protector.

4 Claims, 7 Drawing Sheets

FIG. 7
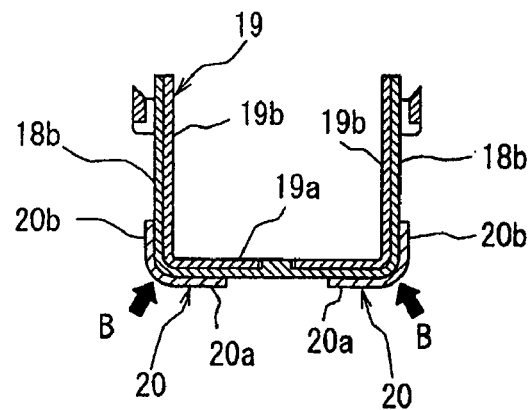
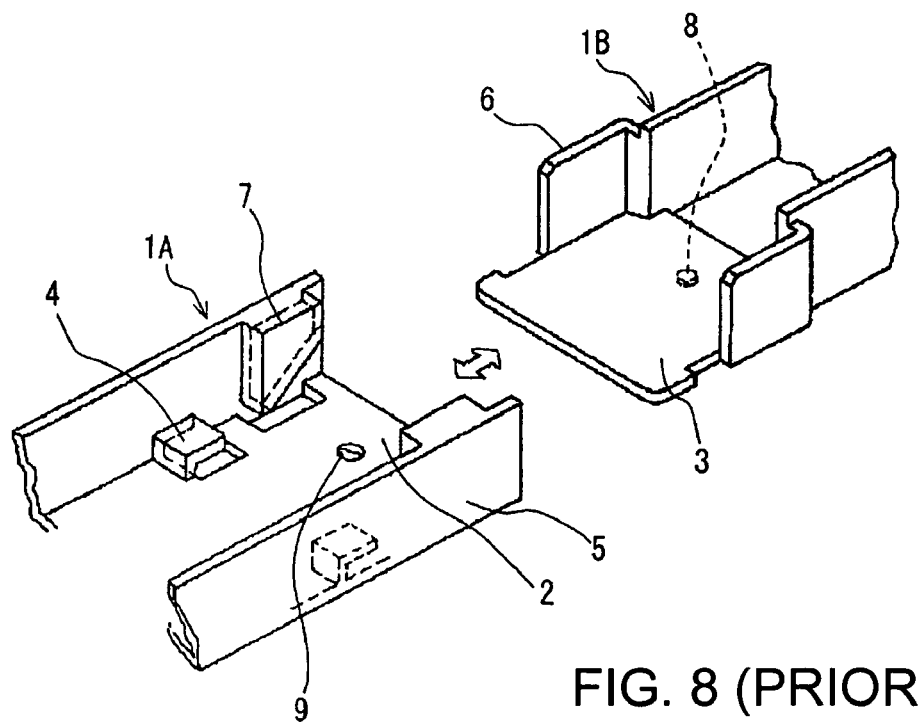
FIG. 8 (PRIOR ART)

PROTECTOR FOR WIRE HARNESS

BACKGROUND OF THE INVENTION

1. Field of the Invention

This invention relates to a protector for a wire harness and more particularly relates to a connecting type protector in which small segments divided in a longitudinal direction are assembled to enhance strength of a coupling site.

2. Description of the Related Art

Recently, a wire harness to be arranged in a motor vehicle has been upsized and complicated and an amount of electrical cables has been increased more and more. Since a space for arranging a wire harness in a motor vehicle is limited, it has been required for the wire harness to be arranged in a narrow space along a vehicle body panel in a high accuracy and density manner. Furthermore, in order to avoid interference between the wire harness and external components, a protector made of a resin product sheathes the wire harness in many cases.

In the case where the protector made of the resin product cannot be formed at a time by die-molding on account of a complicated bent configuration of the protector, the protector is divided into a plurality of segments to mold the segments individually and then the divided segments are assembled to form the protector.

FIG. 8 shows an example of a prior art connecting type protector including gutter-like protector members 1A and 1B. The protector member 1A is provided on a bottom wall 2 with holding bottom pieces 4 into which a distal end of a bottom wall 3 of the protector member 1B is inserted and held. The protector member 1A is provided on opposed side walls 5 with holding side pieces 7 into which distal ends of opposed side walls 6 of the protector member 1B is inserted and held. The bottom wall 3 and opposed side walls 6 of the protector member 1B are superposed on inner surfaces of the bottom wall 2 and opposed side walls of the protector member 1A. The distal ends of the bottom wall 3 and opposed side walls 6 of the protector member 1B are inserted into and held in the holding bottom pieces 4 and holding side pieces 7 of the protector member 1A. An engaging protrusion 8 that projects from a rear side of the bottom wall 3 of the protector member 1B is engaged with an engaging recess provided on a front side of the bottom wall 2 of the protector member 1A. Then, the protector members 1A and 1B are connected to each other. (See JP HEI 10 (1998)-84613 A1)

SUMMARY OF THE INVENTION

However, the coupling site in the above connecting type protector has a low strength in construction and is likely to be deformed upon a longitudinal load or a lateral load. Consequently, the coupling site will be damaged by interference between the coupling site and other vehicle components when the coupling site is deformed. Accordingly, it has been required to enhance strength of the coupling site.

In view of the above problems, an object of the present invention is to provide a protector for a wire harness in which a coupling site has a high strength and is not subject to deformation.

In order to achieve the above object, a protector for a wire harness in accordance with the present invention comprises first and second protector member made of a resin molding product and having U-shaped configurations in cross section that include a bottom wall and parallel opposed side walls. The first protector member is provided on a longitudinal end with a first coupling portion. The second protector member is provided on a longitudinal end with a second coupling portion. The first and second coupling portions are connected to each other. The first coupling portion of the first protector member includes an inner wall section having a U-shaped cross section and a cover section. The inner wall section has an inner bottom wall and parallel opposed inner side walls that are continuously connected to the parallel opposed side walls of the first protector member. The cover section extends from an outer surface of the inner bottom wall through opposite corners to the opposed inner side walls of the inner wall section to define a double wall structure. The cover section projects to a distal end opening in the first protector member. The double wall structure is open at a coupling end. The inner bottom wall or the opposed inner side walls of the inner wall section are provided with a through-hole. A clearance is defined between the inner wall section and the cover section. The second coupling portion of the second protector member includes a bottom wall and opposed side walls that are inserted through the distal end opening into the clearance in the first coupling portion. The opposed side walls of the second coupling portion are continuously connected to the opposed side walls of the second protector member. The bottom wall of the second coupling portion is disposed at a lower position than the bottom wall of the second protector member. The second coupling portion is provided on the bottom wall or opposed side walls with a protrusion to be fitted in the through-hole in the inner wall section. The first and second coupling portions of the first and second protector members are adapted to define a triple wall structure in which the second coupling portion of the second protector member is caught between the inner wall section and the cover section of the first coupling portion having the double wall structure. The bottom walls of the first and second protector members are continuously connected to each other without causing a stepped portion.

The coupling site of the protector constructed above has a triple wall structure in which the inner wall section of the first protector member is superimposed on the inner surface of the second coupling portion of the second protector member, the cover section of the first protector member is superposed on the outer surface of the second coupling portion of the second protector member, and the second protector member is caught between the inner wall section and cover section of the first protector member. In particular, the opposite corners bent from the inner bottom wall to the opposed side walls of the first coupling portion are likely to be subject to maximum concentration of stress when a longitudinal load or a lateral load is applied to the coupling site. The triple wall structure in the opposite corners can effectively enhance strength against the longitudinal and lateral loads and resistance of deformation, in comparison with the conventional bouble wall structure.

As described above, since the second protector member is caught between the inner wall section and the cover section of the first protector member, it is possible to position the first and second protector members in upper and lower directions and right and left directions (directions toward the opposed side walls). Since the protrusion of the second protector member is inserted into the through-hole in the first protector member, it is possible to prevent the second protector member from moving apart from the first protector member. That is, it is possible to position the first and second protector members in the three dimensions in upper and lower directions, right and left directions, and front and back directions (coupling directions perpendicular to the right and left directions) without engaging a locking pawl on one of the first and second protector members with a locking hole in the other of the first and second protector members.

The through-hole is provided in the first protector member while the protrusion is provided on the second protector member to be fitted in the through-hole. This is not limited. The through-hole may be provided in the second protector member while the protrusion may be provided on the first protector member to be fitted in the through-hole. If the through-hole is provided in the first protector member, it will be easy to insert the second coupling portion of the second protector member into the first coupling portion of the first protector member.

The first and second protector members include first and second lids, respectively. Each of the lids is provided on an end at laterally opposite sides with a locking portion extending downward from an upper wall of each of the lids. One of the first and second coupling portions of the first and second protector members is provided on upper outer surfaces of the opposed side walls with two portions being locked. The locking portions on the first and second lids of the first and second protector members engage with the portions being locked when the first and second coupling portions of the first and second protector members are connected to each other.

Thus, one of the first and second protector members is provided with the portions being locked for both lids and the locking portions on both lids for the first and second protector members engage with the portions being locked. That is, since the first and second protector members are connected to each other through the lids, it is possible to further enhance strength in coupling.

The cover section provided on the first coupling portion of the first protector member may be formed into either a U-shaped configuration in cross section that covers a whole surface of the inner bottom wall and lower parts of the inner opposed side walls of the inner wall section, or a pair of L-shaped configurations in cross section that cover opposite corner portions between the inner bottom wall and the opposed inner side walls of the inner wall section. That is, so long as the bottom wall and opposed side walls of the second protector member are caught between the inner wall section and the cover section of the first protector member and between the opposed inner side walls of the inner wall section and the cover section, a size of the cover section is not limited.

An inner end of the cover section at a side opposite to the distal end opening projects from the inner bottom wall and opposed inner side walls of the first protector member. The projecting inner end is bent in parallel to the inner bottom wall and opposed inner side walls of the inner wall section and is extended to the distal end opening to define the clearance.

According to the above structure, it is possible to maintain a certain distance in the space between the cover section of the first protector member and the bottom wall and opposed side walls of the inner wall section. If the distance is substantially the same as the thickness of the bottom wall and opposed side walls of the second protector member, it is possible to couple the first and second coupling portions without causing any backlash and play between the coupling portions and to enhance strength of the coupling portions.

The through-hole in the first coupling portion of the first protector member and the protrusion on the second coupling portion of the second protector member may be provided on either the bottom walls or the opposed side walls so long as they can contact with each other. However, it is preferable to provide them on one of both opposed side walls in view of a fitting work.

The through-hole and protrusion may be on either only one position or plurality of positions.

The protector of the present invention can be most effectively utilized in the case where the first and second protector members are connected to each other through the first and second coupling portions in the bent manner. However, in the case of an upsized protector, the protector may be divided into the first and second protector members on a straight part as well as a bent part and the divided protector members may be connected to each other. Furthermore, a combination of the first and second protector members is not limited. In the case where the protector has many bent portions or an upsized and elongated configuration, the protector may be divided into first, second, third, fourth . . . sections and ends of the divided sections are coupled to one another through the coupling portions.

As described above, according to the present invention, in the coupling site of the divided protector members, the one first protector member is provided with a bouble wall structure including the bottom walls and opposed side walls while the other second protector member is inserted into the double wall structure. Thus, the second protector member is caught between the inner wall section and the cover section of the first protector member to define a triple wall structure. This triple wall structure can enhance more effectively strength of the opposite corners that are likely to be subject to concentration of stress in comparison with the conventional coupling structure, thereby effectively preventing the coupling site from being deformed.

Furthermore, as described above, since the bottom walls and opposed side walls are superposed and coupled and the protrusion on the second protector member is fitted in the through-hole in the first protector member, it is possible to prevent the first and second protector members from moving apart from each other and to couple the first and second protector members divided in the three dimensions to each other.

Since the first and second lids are mounted on the first and second protector members and the locking portions on the lids engage with the portions being locked on one of the protector members, the first and second protector members are coupled through the lids to each other, thereby making the coupling site strong.

BRIEF DESCRIPTION OF THE DRAWINGS

FIG. 7 is a cross section view of the coupling portions taken along lines VII-VII in FIG. 6B.

FIG. 8 is a perspective view of a prior art protector.

DETAILED DESCRIPTION OF THE PREFERRED EMBODIMENTS

Figure 1:
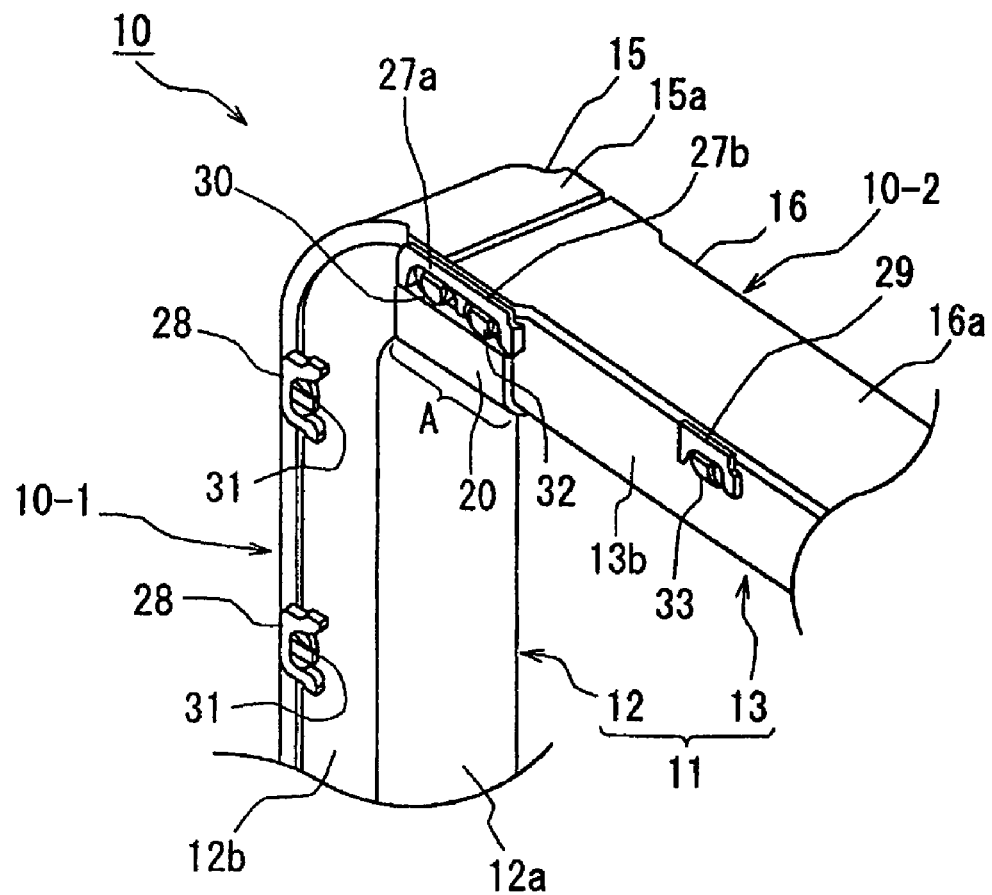
FIG. 1 is a perspective view of a first embodiment of a main part of a protector for a wire harness in accordance with the present invention.

Referring now to the drawings, embodiments of a protector for a wire harness in accordance with the present invention will be described below.

FIGS. 1 to 4 show a first embodiment of a protector 10 for a wire harness in accordance with the present invention. The protector 10 sheathes a wire harness (not shown) that is arranged along a vehicle body of a motor vehicle. As shown in FIG. 1, the protector 10 is formed into a bent configuration along an arranging path of the wire harness.

The protector 10 is constructed by integrally coupling a first protector 10-1 and a second protector 10-2 through a coupling site A to each other in a bent configuration. The first and second protectors 10-1 and 10-2 are mode of different resin molding products.

The first protector 10-1 includes a first protector member 12 and a first lid 15 that closes an upper opening of the first protector member 12. The second protector 10-2 includes a second protector member 13 and a second lid 16 that closes an upper opening of the second protector member 13.

As shown in FIG. 2, the first protector member 12 and second protector member 13 are provided on each end in a longitudinal direction with a first coupling portion 17 and a second coupling portion 18, respectively. The first and second coupling portions 17 and 18 are connected to each other to define the coupling site A.

Figure 2A:
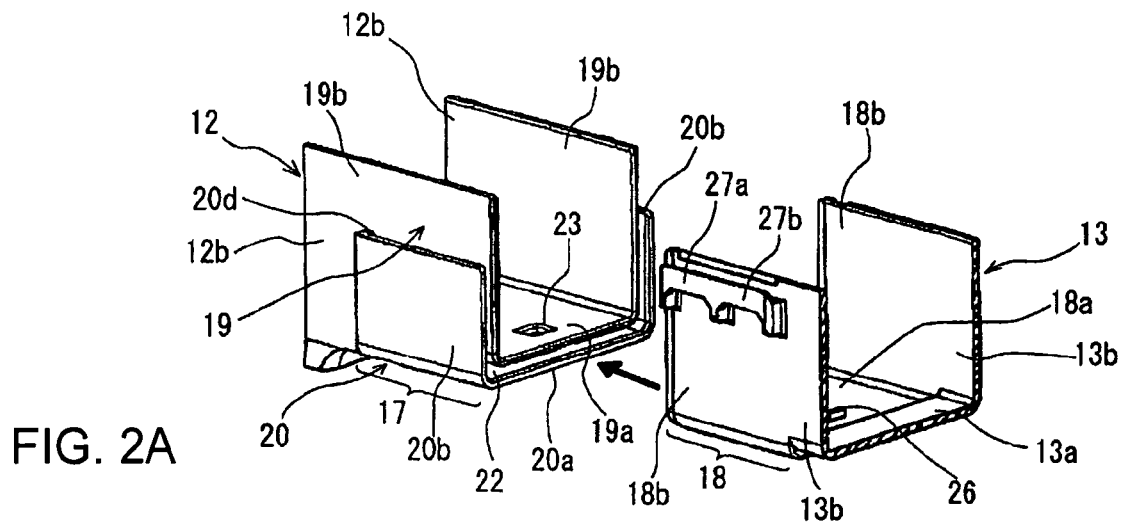
FIG. 2A is a perspective view of first and second coupling portions of first and second protector members, illustrating the first and second protector members before being coupled.
Figure 2B:
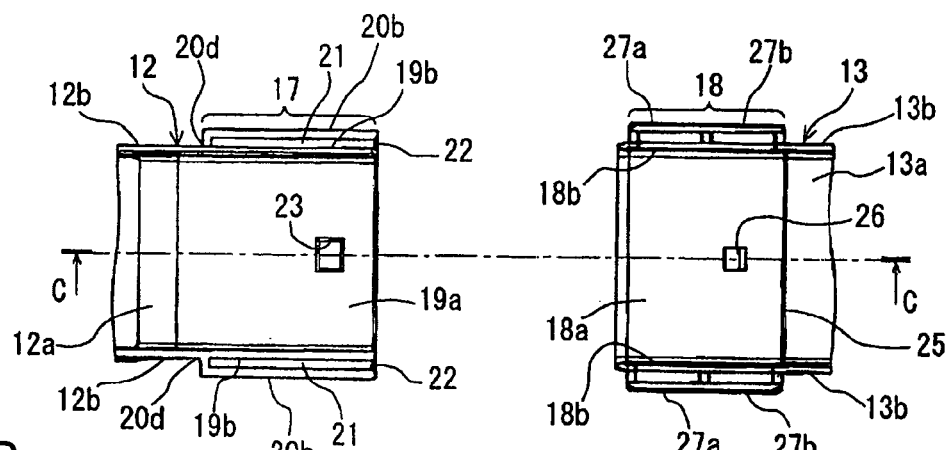
FIG. 2B is a plan view of the coupling portions shown in FIG. 2A.
Figure 2C:
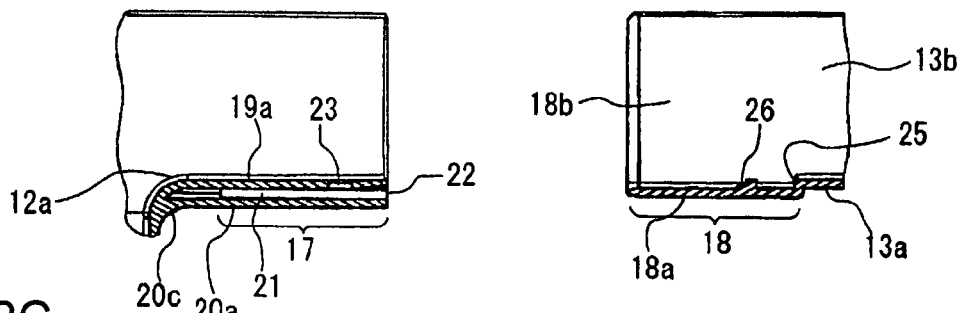
FIG. 2C is a longitudinal section view of the coupling portions taken along lines C-C in FIG. 2B.

As shown in FIGS. 2A to 2C, the first coupling portion 17 of the first protector member 12 includes an inner wall section 19 and a cover section 20 that are spaced apart from each other and parallel to each other through a clearance 21. The first coupling portion 17 is provided on a distal end with an opening 22.

The inner wall section 19 is formed into a U-shaped configuration in cross section that includes an inner bottom wall 19a and opposed inner side walls 19b that are continuously connected to the bottom wall 12a and opposed side walls 12b of the first protector member 12.

The cover section 20 is formed into a U-shaped configuration in cross section that includes a bottom wall 20a that covers a whole surface of the inner bottom wall 19a of the inner wall section 19, and opposed side walls 20b that cover lower parts of the opposed inner side walls 19b of the inner wall section 19.

In more detail, as shown in FIG. 2C, the bottom wall 20a of the cover section 20 has an inner end 20c extending from an outer side of a bent portion of the bottom wall 12a of the first protector member 12 at a side opposite to a distal end of the opening 22. The inner end 20c is spaced apart from and parallel to the inner bottom wall 19a of the inner wall section 19 through the clearance 21 and is extended to a distal end of the opening 22.

Also, as shown in FIG. 2B, the opposed side walls 20b of the cover section 20 have an inner end 20d projecting from an outer side of the opposed side walls 12b of the first protector member 12 at a side opposite to a distal end of the opening 22. The inner end 20d is bent and spaced apart from and parallel to the opposed side walls 19b of the inner wall section 19 and is extended to a distal end of the opening 22 so that the projecting inner end 20d defines the clearance 21.

The inner bottom wall 19a of the inner wall section 19 of the first protector member 12 is provided with a through-hole 23 that receives a protrusion 26 (mentioned hereafter) of the second protector member 13.

As shown in FIGS. 2A to 2C, the second coupling portion of the second protector member 13 is formed into a U-shaped configuration that includes a bottom wall 18a and opposed side walls 18b that are inserted into and fitted in the clearance 21 in the first coupling portion 17 of the first protector portion 17. The opposed side walls 18b are continuously connected to the opposed side walls 13b of the second protector member 13 while the bottom wall 18a of the second protector member 13 is connected to the bottom wall 13a through a stepped portion 25 (FIG. 2C). The bottom wall 18a is disposed at a position lower than the bottom wall 13a.

The stepped portion 25 has the same size as a thickness of the inner bottom wall 19a of the inner wall section 19 of the first protector member 12. When the first and second protectors 12 and 13 are connected to each other, as shown in FIG. 3D, the bottom wall 12a of the first protector member 12 is continuously connected to the bottom wall 13a of the second protector member 13 without making the stepped portion.

The bottom wall 18a of the second coupling portion 18 is provided on an upper surface with a protrusion 26 to be inserted into the through-hole 23 in the inner wall section 19 of the first protector member 12.

Figure 3A:
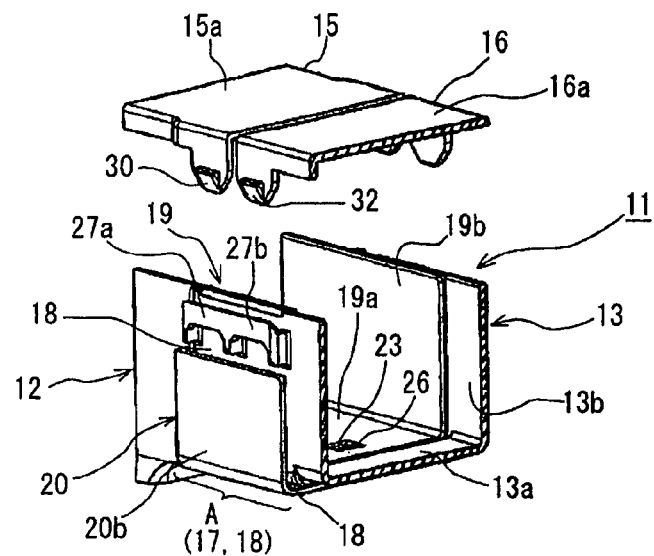
FIG. 3A is a perspective view of the first and second coupling portions of the first and second protector members, illustrating the first and second coupling members in a coupled position.
Figure 3B:
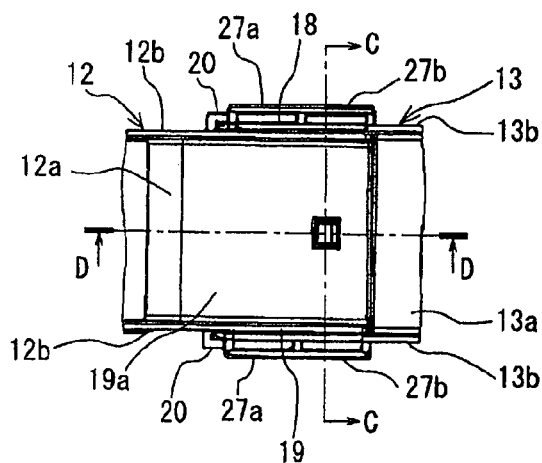
FIG. 3B is a plan view of the coupling portions shown in FIG. 3A.

As shown in FIG. 3A, the opposed side walls 18b of second the coupling portion 18 are provided on outer surfaces at upper sides with two portions being locked 27a and 27b that receive locking portions 30 and 32 (mentioned hereafter) of the first lid 15 and the second lid 16.

As shown in FIG. 3A, the locking portions 30 extend downward from the opposite sides in a widthwise direction at a longitudinal end of an upper wall 15a of the first lid 15 that covers the upper opening of the first protector member 12.

Also, as shown in FIG. 1, the upper wall 15a is provided on opposite sides in a widthwise direction with a plurality of locking portions 31 that are spaced apart from one another in a longitudinal direction and extend downward.

As shown in FIG. 3A, the locking portions 32 extend downward from the opposite sides in a widthwise direction at a longitudinal end of an upper wall 16a of the second lid 16 that covers the upper opening of the second protector member 13.

Also, as shown in FIG. 1, the upper wall 16a is provided on opposite sides in a widthwise direction with a plurality of locking portions 33 that are spaced apart from one another in a longitudinal direction and are extended downward.

As shown in FIG. 1, the first protector member 12 is provided on the opposed side walls 12b at the outer sides with a plurality of portions being locked 28 that receive the locking portions 31 of the first lid 15 and that are spaced apart from one another.

Similarly, the second protector member 13 is provided on the opposed side walls 13b at the outer sides with a plurality of portions being locked 29 that receive the locking portions 33 of the second lid 16 and that are spaced apart from one another.

Next, a process for assembling the protector 10 having the above structure will be described below.

Firstly, as shown in FIG. 2A, the second coupling portion 18 of the second protector member 13 is inserted into the clearance from the opening 22 in the first coupling portion 17 of the first protector member 12.

As shown in FIGS. 3A to 3D, the second coupling portion 18 of the second protector member 13 is fitted into a space defined between the inner wall section 19 and the cover section 20 of the first protector member 12, the protrusion 26 on the second protector member 13 is fitted into the through-hole 23 in the first protector member 12, thereby forming the body portion 11 connected through the coupling site A.

Figure 4A:
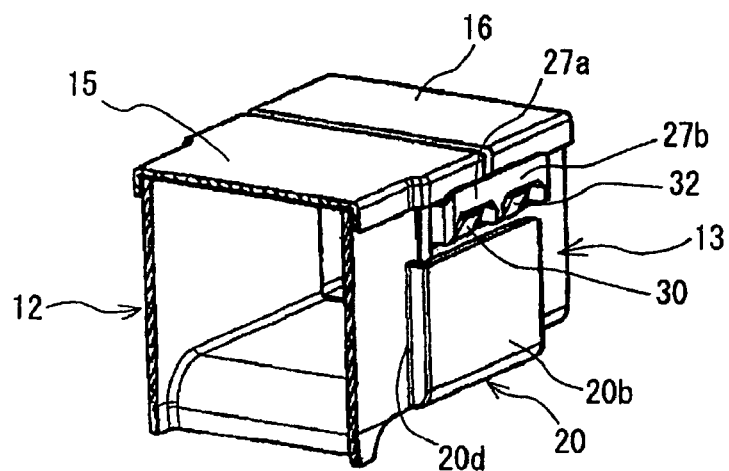
FIG. 4A is a perspective view of the first and second coupling portions shown in FIG. 3A, illustrating the coupling portions on which lids are locked.
Figure 4B:
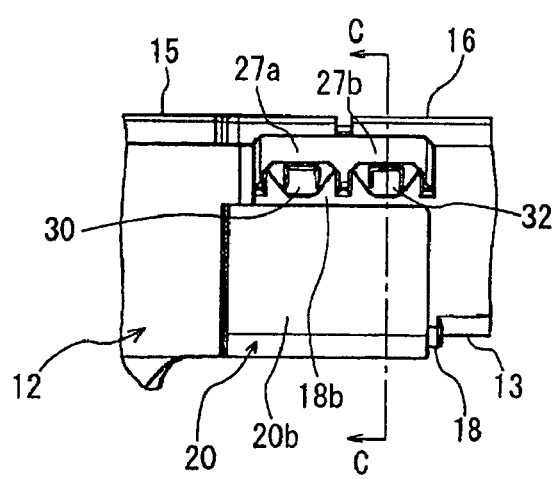
FIG. 4B is a side elevation view of the coupling portions shown in FIG. 4A.

Secondly, as shown in FIG. 3A, FIGS. 4A and 4B, the first and second lids 15 and 16 are mounted on and locked onto an upper surface of the body portion 11.

At this time, the first lid 15 is mounted on the upper surface of the first protector member 12 and, as shown in FIG. 1, the locking portion 31 of the first lid 15 is inserted into and engage with the portion being locked 28 of the first protector member 12. As shown in FIG. 3A, the locking portion 30 mounted on the coupling site A is inserted into and is engaged with the portion being locked 27a of the second protector member 13. Also, the second lid 16 is mounted on the upper surface of the second protector member 13 and, as shown in FIG. 1, the locking portion 33 of the second lid 16 is inserted into and is engaged with the portion being locked 29 of the second protector member 13. As shown in FIG. 3A, the locking portion 32 mounted on the coupling site A is inserted into and is engaged with the portion being locked 27b of the second protector member 13.

Figure 3C:
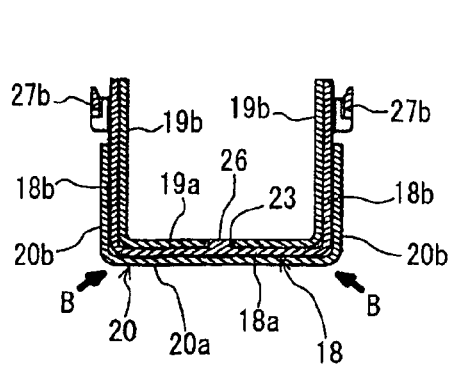
FIG. 3C is a cross section view of the coupling portions taken along lines C-C in FIG. 3B.
Figure 3D:
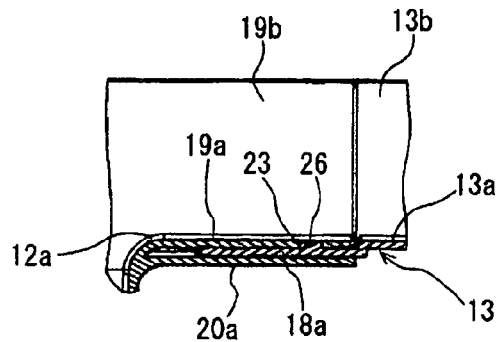
FIG. 3D is a longitudinal section view of the coupling portions taken along lines D-D in FIG. 3B.

As shown in FIGS. 3A to 3D, the coupling site A of the protector 10 constructed above defines a triple wall structure having a U-shaped configuration in cross section in which the second coupling portion 18 of the second protector member 13 is caught between the inner wall section 19 and the cover section 20 of the first protector member 12. In particular, as shown in FIG. 3C, since opposite corners B, B that are likely to be subject to concentration of stress upon loading is formed into the triple wall structure, strength of the protector is increased significantly, thereby enhancing resistance of deformation against longitudinal and lateral loads to the protector 10.

Figure 4C:
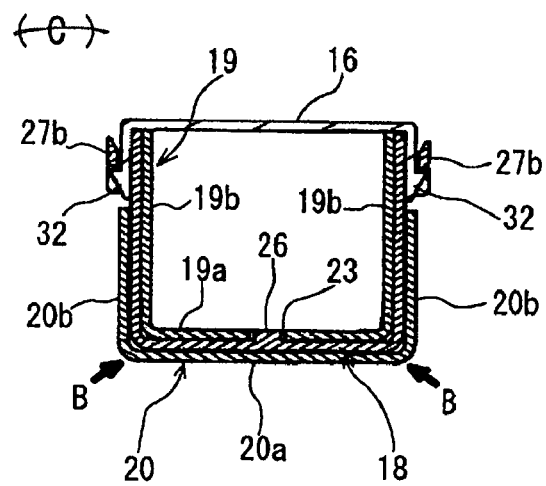
FIG. 4C is a cross section view of the coupling portions taken along lines C-C in FIG. 4B.

Also, the locking portions 30 and 32 of the first and second lids 15 and 16 are engaged with the portions being locked 27a and 27b provided on the opposed side walls 18b of the second protector member 13. That is, as shown in FIGS. 4A to 4C, since the first and second lids 15 and 16 are coupled to the second protector member 13 in the coupling site A, the first protector member 12 is coupled through the first lid 15 to the second protector member 13, thereby enhancing the coupling strength in the coupling site A.

FIG. 5 shows an alteration of the first embodiment. The portions being locked 27a and 27b are provided on the first coupling portion 17 of the first protector member 12 so that the portions 27a and 27b are engaged with the locking portions 30 and 32 projecting from the ends of the first and second lids 15 and 16.

Figure 5A:
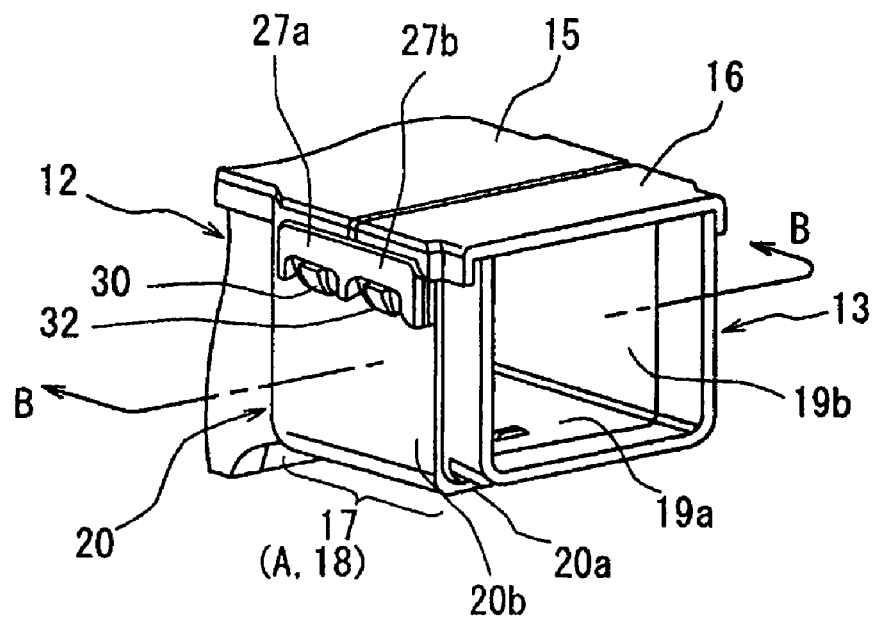
FIG. 5A is a perspective view of a main part of an alteration of the first embodiment in accordance with the present invention.
Figure 5B:
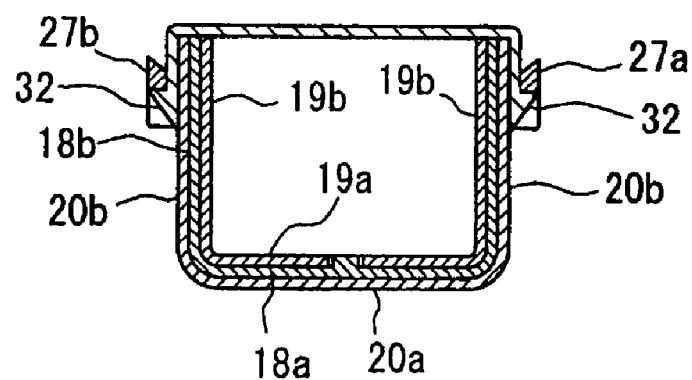
FIG. 5B is a cross section view of the coupling portions taken along lines B-B in FIG. 5A.

In more detail, as shown in FIGS. 5A and 5B, the opposed side walls 20b of the cover section 20 of the first protector member 12 extend to upper ends of the opposed side walls 19b of the inner wall section 19 to cover the whole surface of the opposed inner side walls 19b. The portions being locked 27a and 27b project from the upper surfaces of the opposed side walls 20b.

Figure 6A:
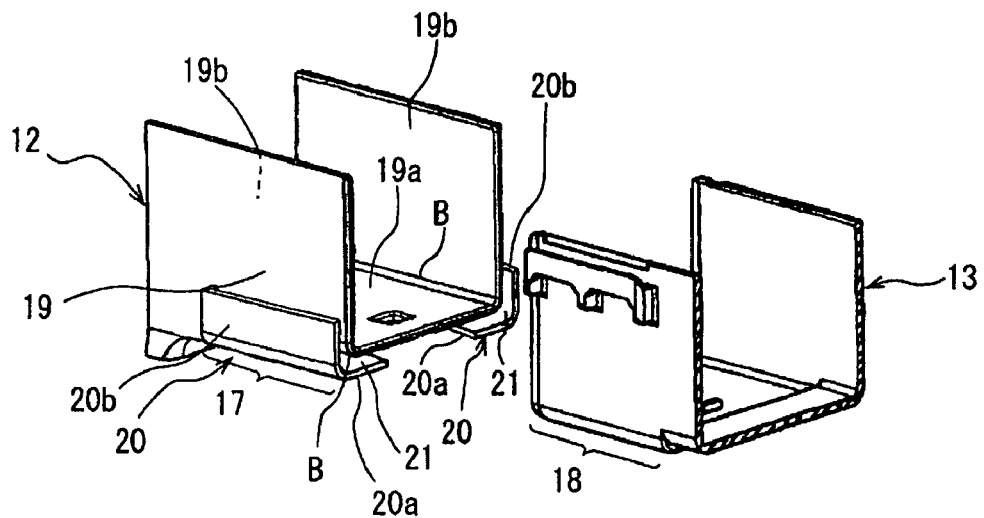
FIG. 6A is a perspective view of a second embodiment of first and second coupling portions of first and second protector members in accordance with the present invention, illustrating the coupling portions before being coupled.
Figure 6B:
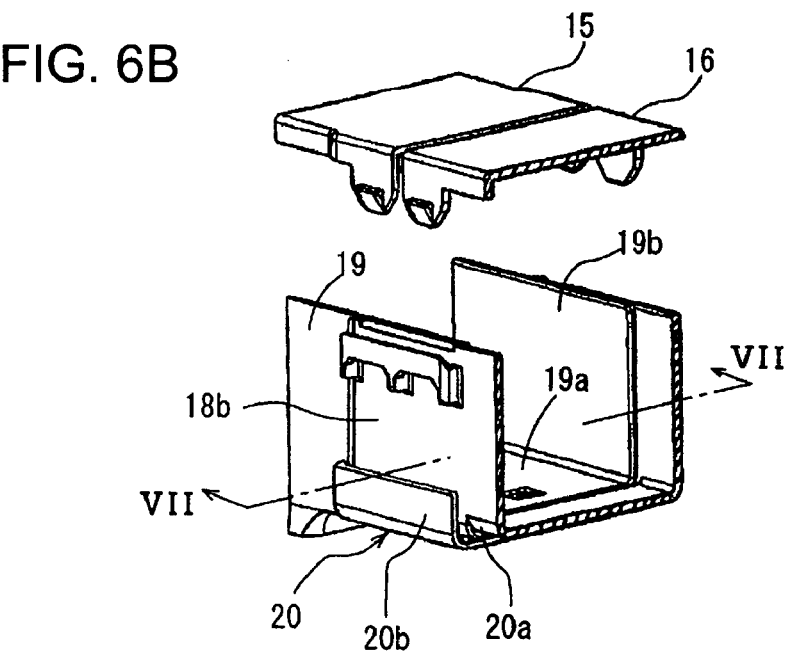
FIG. 6B is a perspective view of the coupling portions shown in FIG. 6A, illustrating the coupling portions in a coupled position.

FIGS. 6A, 6B and FIG. 7 show a second embodiment of a protector for a wire harness in accordance with the present invention.

In the second embodiment, a pair of right and left cover sections 20, 20 are provided at positions that cover the opposite corners B, B on the inner wall section 19 of the first coupling portion 17 of the first protector member 12.

In more detail, as shown in FIGS. 6A and 6B, cover sections 20, 20 having L-shaped configurations in cross section are spaced apart from each other by a clearance 21 at the positions where the cover sections 20, 20 cover a space from the opposite sides of the inner bottom wall 19a of the inner wall section 19 of the first protector member 12. Each of the cover sections 20, 20 is provided with a bottom wall 20a and a side wall 20b.

In the second embodiment, the cover sections 20, 20 are smaller than the cover section of the first embodiment and the triple wall structure is reduced than that of the first embodiment. However, since, as shown in FIG. 7, the coupling portion 18 of the second protector member 13 are caught between the inner wall section 19 and the cover sections 20, 20 of the first protector member 12 to define the triple wall structure in the opposite corners B, B that are likely to be subject to concentration of stress, it is possible to enhance effective strength of the protector while restraining a cost of materials.

The invention claimed is:
1. A protector for a wire harness comprising:
a first protector member made of a resin molding product and having a U-shaped configuration in cross section that includes a bottom wall and parallel opposed side walls, said first protector member being provided on a longitudinal end with a first coupling portion; and
a second protector member made of a resin molding product and having a U-shaped configuration in cross section that includes a bottom wall and parallel opposed side walls, said second protector member being provided on a longitudinal end with a second coupling portion;
said first and second coupling portions being connected to each other;
said first coupling portion of said first protector member including an inner wall section having a U-shaped cross section and a cover section, said inner wall section having an inner bottom wall and parallel opposed inner side walls that are continuously connected to said parallel opposed side walls of said first protector member, and said cover section extending from an outer surface of said inner bottom wall through opposite corners to said opposed inner side walls of said inner wall section to define a double wall structure, said cover section projecting to a distal end opening in said first protector member, said double wall structure being open at a coupling end, said inner bottom wall or said opposed inner side walls of said inner wall section being provided with a through-hole, and a clearance being defined between said inner wall section and said cover section;
said second coupling portion of said second protector member including a bottom wall and opposed side walls that are inserted through said distal end opening into said clearance in said first coupling portion, said opposed side walls of said second coupling portion being continuously connected to said opposed side walls of said second protector member, said bottom wall of said second coupling portion being disposed at a lower position than said bottom wall of said second protector member, and said second coupling portion being provided on said bottom wall of said second coupling portion or opposed side walls of said second coupling portion with a protrusion to be fitted in said through-hole in said inner wall section;

said first and second coupling portions of said first and second protector members being adapted to define a triple wall structure in which said second coupling portion of said second protector member is caught between said inner wall section of said first coupling portion and said cover section of said first coupling portion having said double wall structure, and said bottom walls of said first and second protector members being continuously connected to each other without causing a stepped portion.

2. A protector for a wire harness according to claim 1, wherein said first and second protector members include first and second lids, respectively, and each of said lids is provided on an end at laterally opposite sides with a locking portion extending downward from an upper wall of each of said lids;

wherein one of said first and second coupling portions of said first and second protector members is provided on upper outer surfaces of said opposed side walls thereof with two portions being locked; and wherein said locking portions on said first and second lids of said first and second protector members engage with said portions being locked when said first and second coupling portions of said first and second protector members are connected to each other.

3. A protector for a wire harness according to claim 1, wherein said cover section provided on said first coupling portion of said first protector member is formed into a U-shaped configuration in cross section that covers a whole surface of said inner bottom wall of said first coupling portion and lower parts of said opposed inner side walls of said inner wall section of said first coupling portion, or a pair of L-shaped configurations in cross section that cover opposite corner portions between said inner bottom wall of said first coupling portion and said opposed inner side walls of said inner wall section of said first coupling portion;

wherein an inner end of said cover section at a side opposite to said distal end opening projects from said inner bottom wall of said first coupling portion and said opposed inner side walls of said inner wall section of said first coupling portion, and said projecting inner end is bent in parallel to said inner bottom wall of said first coupling portion and said opposed inner side walls of said inner wall section of said first coupling portion to define said clearance and is extended to said distal end opening; and wherein said first coupling portion of said first protector member is provided in said inner bottom wall thereof with said through-hole and said second coupling portion of said second protector member is provided on said bottom wall thereof with said protrusion.

4. A protector for a wire harness according to claim 1, wherein said first and second protector members are coupled through said first and second coupling portions to each other in a bent connection manner.

* * * * *